US009134129B2

(12) United States Patent
Figueroa

(10) Patent No.: US 9,134,129 B2
(45) Date of Patent: Sep. 15, 2015

(54) NAVIGATION DEVICE FOR DEAD RECKONING

(71) Applicant: Microsoft Corporation, Redmond, WA (US)

(72) Inventor: Joseph Figueroa, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 260 days.

(21) Appl. No.: 13/858,831

(22) Filed: Apr. 8, 2013

(65) Prior Publication Data

US 2013/0274990 A1    Oct. 17, 2013

Related U.S. Application Data

(63) Continuation of application No. 12/046,426, filed on Mar. 11, 2008, now Pat. No. 8,417,450.

(51) Int. Cl.
| | |
|---|---|
| G01C 21/00 | (2006.01) |
| G01C 21/12 | (2006.01) |
| G01C 21/16 | (2006.01) |
| G01S 19/13 | (2010.01) |
| G01S 19/49 | (2010.01) |

(52) U.S. Cl.
CPC .............. *G01C 21/00* (2013.01); *G01C 21/12* (2013.01); *G01C 21/165* (2013.01); *G01S 19/13* (2013.01); *G01S 19/49* (2013.01)

(58) Field of Classification Search
USPC ........ 701/400, 408–409, 468–470, 472, 32.3, 701/445; 342/357.22–357.24
See application file for complete search history.

(56) References Cited

U.S. PATENT DOCUMENTS

| | | | | |
|---|---|---|---|---|
| 4,220,994 | A * | 9/1980 | Hendrickson | 701/492 |
| 5,583,776 | A * | 12/1996 | Levi et al. | 701/400 |
| 5,995,023 | A * | 11/1999 | Kreft | 340/995.25 |
| 6,132,391 | A | 10/2000 | Onari et al. | |
| 6,577,952 | B2 * | 6/2003 | Geier et al. | 701/446 |
| 6,643,587 | B2 * | 11/2003 | Brodie et al. | 701/472 |
| 6,850,844 | B1 * | 2/2005 | Walters et al. | 701/410 |

(Continued)

FOREIGN PATENT DOCUMENTS

WO    2005040847 A2    5/2005

OTHER PUBLICATIONS

Skog, I., "GNSS—aided INS for Land Vehicle Positioning and Navigation", KTH, Nov. 2007, 136 pages.

(Continued)

*Primary Examiner* — Yonel Beaulieu
(74) *Attorney, Agent, or Firm* — Nicholas Chen; Kate Drakos; Micky Minhas

(57) ABSTRACT

A navigation device is provided that includes a processor configured to track a path of the navigation device based on a first signal received by the navigation device, and calculate a calculated position of the navigation device based on a second signal different from the first signal. The navigation device may further include a graphical user interface configured to display a calculated position graphical element representing the calculated position determined based on the second signal and display a tracked position graphical element representing the path of the navigation device determined based on the first signal, the tracked position graphical element and the calculated position graphical element being distinguishable in appearance.

24 Claims, 4 Drawing Sheets

(56) References Cited

U.S. PATENT DOCUMENTS

| | | |
|---|---|---|
| 7,263,379 B1 | 8/2007 | Parkulo et al. |
| 8,417,450 B2 * | 4/2013 | Figueroa ............... 701/412 |
| 2002/0049538 A1 | 4/2002 | Knapton et al. |
| 2002/0120391 A1 | 8/2002 | Nehls, III |
| 2005/0140544 A1 | 6/2005 | Hamel et al. |
| 2007/0093945 A1 | 4/2007 | Grzywna et al. |
| 2008/0027639 A1 | 1/2008 | Tryom |
| 2008/0167810 A1 | 7/2008 | Wildervanck |

OTHER PUBLICATIONS

"Automotive Navigation System", retrieved on Feb. 11, 2008, at <<http://wn.wikipedia.org/wiki/Automotive_navigation_system>>, 9 Pages.

* cited by examiner

TRACKED POSITION GRAPHICAL ELEMENT 60
(MAP IN FIRST COLOR SCHEME)

TRACKED POSITION GRAPHICAL ELEMENT 60
(MAP IN SECOND COLOR SCHEME)

NAVIGATION DEVICE FOR DEAD RECKONING

CROSS REFERENCE TO RELATED APPLICATIONS

This application is a continuation of U.S. patent application Ser. No. 12/046,426, filed Mar. 11, 2008, granted as U.S. Pat. No. 8,417,450 on Apr. 9, 2013 and entitled ON-BOARD DIAGNOSTICS BASED NAVIGATION DEVICE FOR DEAD RECKONING, the entirety of which is hereby incorporated by reference for all purposes.

BACKGROUND

Portable electronic devices such as Personal Navigation Devices (PND) are increasingly utilized. A PND includes a Global Positioning System (GPS) receiver configured to receive signals from a group of artificial earth satellites called the Global Navigation Satellite System (GNSS). The GPS receiver uses the arrival time of signals from four or more satellites to compute the distance to each satellite. From the relative distances the GPS receiver is able to determine its position, and therefore a user's position, using geometry and trigonometry.

In some cases a vehicle may be equipped with a navigation device integrated with the vehicle's dashboard, and with the vehicle's electronics. In other cases a portable PND may be brought into the vehicle, and may or may not receive power from the vehicle's power supply. The detected position of the GPS receiver may be depicted as a graphical element superimposed over a map on a display to help a user navigate. The graphical element may remain more or less in the same location on the display while the regions displayed on the superimposed map adjust as the vehicle moves, illustrating movement of the user across the map.

A problem sometimes arises when one or more of the signals from the GNSS are dropped. This may happen, for example, if the vehicle goes into a tunnel, or travels adjacent one or more tall buildings, thereby blocking the signal(s) from reaching the receiver. As a result, erroneous display of the position of the vehicle on the map may occur, causing the user to become lost, confused, or miss a turn.

Efforts have been made to provide dead reckoning with PNDs by providing a PND with a built-in accelerometer. This approach has several drawbacks. First, this approach typically only provides dead reckoning for a few seconds at a time. In addition, this approach involves a double integration of the sensed acceleration, which causes accumulated errors in speed and distance calculations.

SUMMARY

A navigation device is provided that includes a processor configured to track a path of the navigation device based on a first signal received by the navigation device, and calculate a calculated position of the navigation device based on a second signal different from the first signal. The navigation device may further include a graphical user interface configured to display a calculated position graphical element representing the calculated position determined based on the second signal and display a tracked position graphical element representing the path of the computing navigation device determined based on the first signal, the tracked position graphical element and the calculated position graphical element being distinguishable in appearance.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
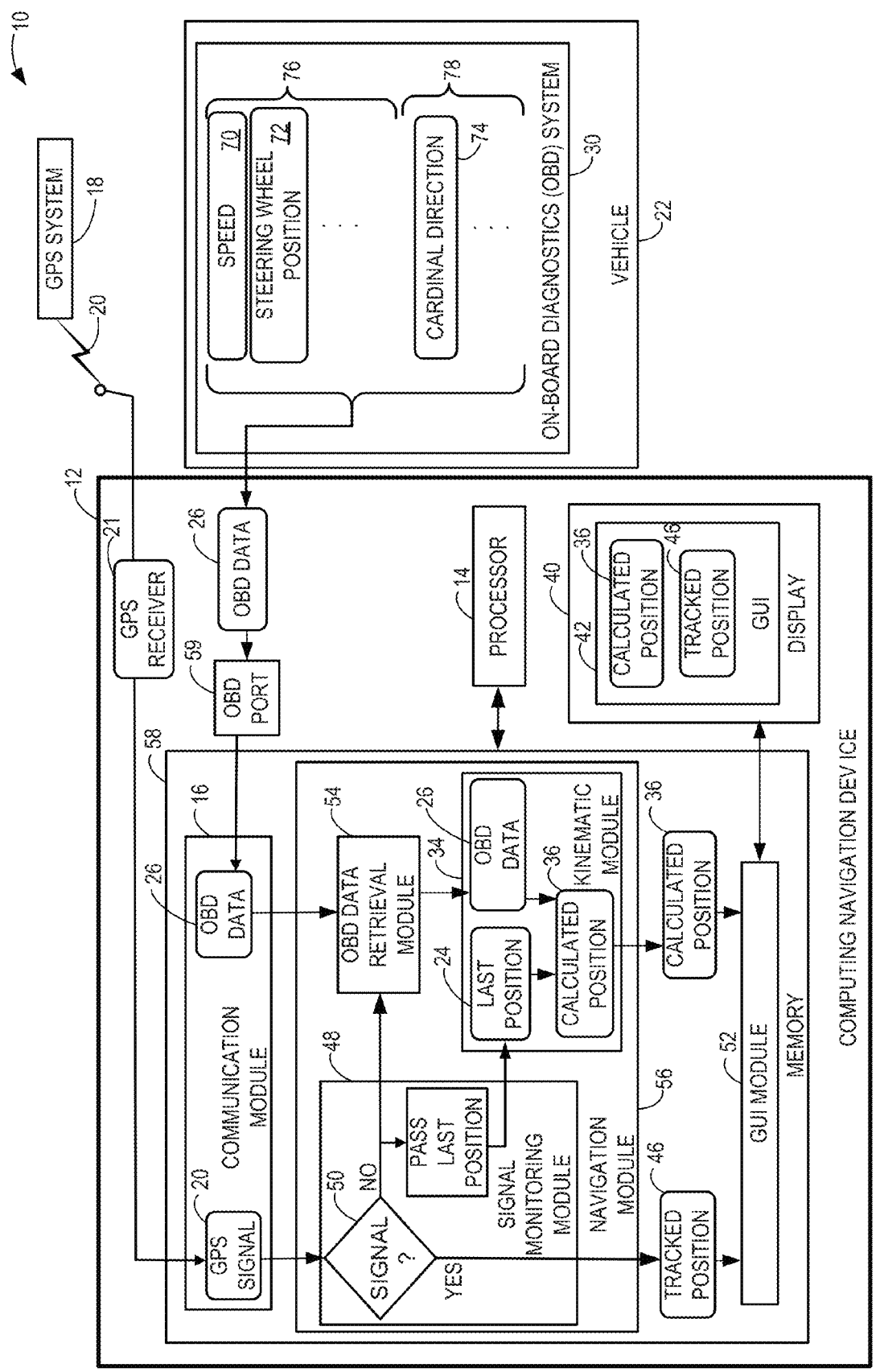
FIG. 1 is a schematic view of an embodiment of a navigation system for dead reckoning, which includes a computing navigation device for use with a vehicle.

FIG. 1 illustrates a navigation system 10 including a computing navigation device 12 for use with a vehicle 22. The computing navigation device 12 may include a processor 14 configured to control, for example, a communication module 16, which is configured to receive one or more signals 20 from a global positioning satellite (GPS) system 18. In the embodiments illustrated, the global positioning satellite (GPS) system is the Global Navigation Satellite System (GNSS), although other satellite positioning systems may be utilized. The signal 20 may correspond to a vehicle position of the vehicle 22. The correspondence may be calculated by the computing navigation device 12 using known methods such as triangulation, or the like.

The computing navigation device 12 may further include a navigation module 56, which in turn includes a kinematic module 34, a signal monitoring module 48, and an OBD data retrieval module 54. The signal monitoring module 48 may be configured to recognize a dropped signal condition in which no operational signal 20 is detected from the GPS system 18. The dropped signal condition may be detected, for example, when no GPS signals are received by the computing navigation device 12, or when fewer than a threshold number of GPS signals used to compute the position of the computing navigation device 12 are received. The threshold number may be four, or another suitable number, for example, three.

The navigation module 56 of the computing navigation device 12 may also be configured to identify a last position 24 of the vehicle 22 corresponding to a time of the dropped signal condition. The OBD data retrieval module 54 may be configured to retrieve on-board diagnostics data, hereinafter referred to as OBD data 26, from an on-board diagnostics system 30 of the vehicle 22, the retrieved OBD data 26 corresponding with a movement of the vehicle 22. The kinematic module 34 may be configured to calculate a calculated position 36 of the vehicle 22 based on the last position 24, and the OBD data 26 of the vehicle 22.

The signal monitoring module 48 may be configured to monitor the GPS signal 20 from the communication module 16 and detect an operational signal condition or a dropped signal condition. The operational signal condition indicates that a sufficient number and/or strength of signals are detected to determine a position of the navigation device 12. The dropped signal condition, as discussed previously, indicates that no operational signal 20 is detected from the GPS system 18. Although the signal module 48 is depicted as communicating through the communication module 16 with the GPS receiver 21, it will be appreciated that alternatively the signal monitoring module 48 may be configured to monitor the signal directly from the GPS receiver 21.

As illustrated in FIG. 1 with decision box 50, if an operational signal condition is detected, then the signal monitoring module 48 may pass the tracked position 46 to the graphical user interface 42 displayed on display 40 via, for example, a graphical user interface 52. But, if no operational signal is detected, which may occur if no signal at all is detected, if the signal strength is below a predetermined threshold, or if signals are detected only from a number of satellites that is below a predetermined threshold and thus insufficient to determine a position of the navigation device 12, then the signal monitoring module 48 is configured to recognize this situation as a dropped signal condition. In response to detecting the dropped signal condition, the signal monitoring module 48 is configured to pass the last position 24 to the kinematic module 34, and communicate with the OBD data retrieval module 54 to pass OBD data 26 to the kinematic module 34. Alternatively, the signal monitoring module 48 is configured to communicate the dropped signal condition directly to the kinematic module 34, which in response is configured to receive OBD data 26 from the communications module 16.

The on-board diagnostics system 30 may be configured to generate OBD data 26, and transmit the OBD data to the communication module 58 via OBD port 59. The OBD port 59 may be a virtual or physical port, and may effect a coupling of the on-board diagnostics system 30 to the computing navigation device 12. The computing navigation device 12 and on-board diagnostics system 30 may be coupled via a wired or wireless coupling, for example.

The OBD data 26 generated by the on-board diagnostics system 30 may be organized to include a plurality of parameters, each of which may include a parameter identifier, and an associate value. The parameters may be used by vehicle technicians to diagnose a vehicle condition. Some parameters may be industry standard parameters 76 utilized by multiple vehicle manufacturers, while others may be model-specific parameters 78 used by the manufacturer of a specific vehicle model.

Example standard parameters 76 that the on-board diagnostics system 30 may be configured to provide include a speed 70 and a steering wheel position 72 of the vehicle 22. Example model specific parameters 78 include a cardinal direction 74 sensed by a compass outfitted on the vehicle 22. Thus, it will be appreciated that the kinematic module 34 may be configured to calculate the calculated position 36 based on one or more of the speed 70, the steering wheel angle 72, and the cardinal direction 74, among other parameters. It should be understood these parameters are merely exemplary, and various other parameters may be used to effect dead reckoning as well.

The kinematic module 34 may be further configured to calculate an updated calculated position of the vehicle 22 based on the calculated position 36 and updated OBD data 26 from the on-board diagnostics system 30. This may be done iteratively such that a substantially continuously updated vehicle position may be displayed on the graphical user interface 42 on display 40 from a substantially continuously updated calculated position 36. The updating of the calculated position 36 may occur until a signal of sufficient strength is detected by the signal monitoring module 48, at which time the navigation module 56 may determine a new tracked position 46, which may be displayed on the graphical user interface 42 on display 40.

The computing navigation device 12 may include a graphical user interface module 52 that is configured to render a graphical user interface 42 on display 40. The graphical user interface module 52 may be configured to display a representation of the tracked position 46 of the vehicle 22 based on the GPS system signal 20, and the calculated position 36 based on the OBD data, on the graphical user interface 42 on display 40.

In some embodiments, the graphical user interface 42 also may be configured to receive a user input to effect selected retrieval of the OBD data 26. For example, during a setup procedure the user may input model information of the user's vehicle, so that model specific parameters 78 may be utilized. As another example, the user may input user preferences for the type of standard parameters 76 to be utilized. It will be appreciated that the computing navigation device may default to receiving the standard parameters indicating speed and steering wheel position, and a user may choose additional parameter options. Through such a set up procedure, the OBD data 26 for retrieval may be selected by the user from one or more standard parameters 76, and/or one or more model specific parameters 78.

The communication module 16, the navigation module 56 and the interface module 52 may all be stored in a memory 58 that is associated with the processor 14. The memory may include non-volatile memory and volatile memory, and the processor 14 may be configured to execute the modules using portions of each.

FIGS. 2, 3, 4A, and 4B illustrate various screens of graphical user interface 42. The graphical user interface 42 may be configured to display the tracked position 46 of the vehicle 22 via a tracked position graphical element 60 during a signal receiving condition which includes an operational signal being received from the GPS system 18 that enables the tracking of the position of the computing navigation device. The graphical user interface 42 may be further configured to display the calculated position 36 of the vehicle 22 via a calculated position graphical element 62 during the dropped signal condition. As described below in further detail, the tracked position graphical element 60 and the calculated position graphical element 62 are distinguishable in appearance.

Figure 2:
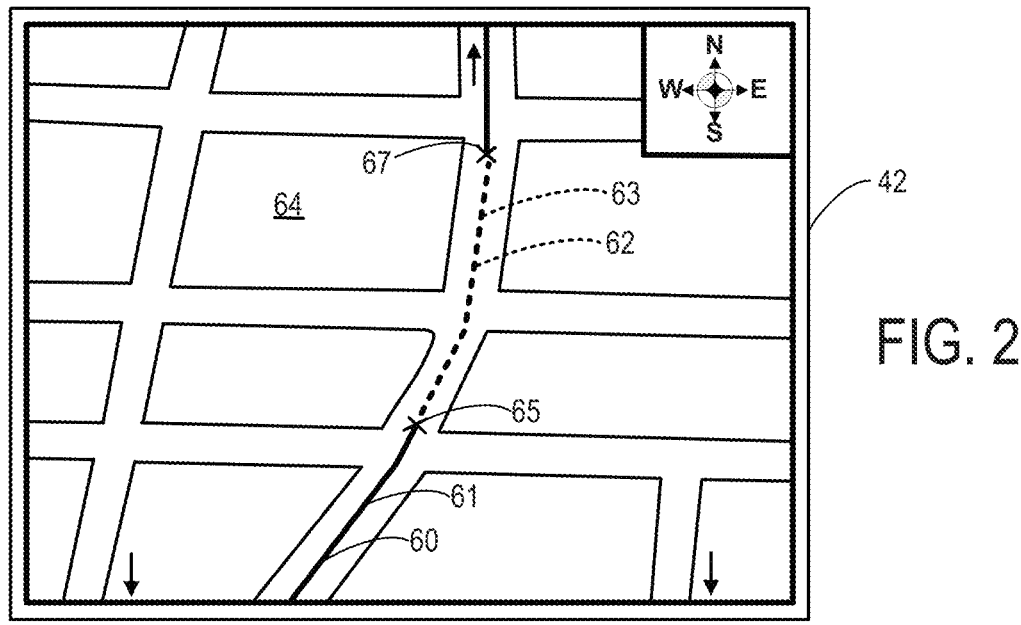
FIG. 2 illustrates a first screen of a graphical user interface that is displayed on a display of the computing navigation device illustrated in FIG. 1, showing a tracked position and a calculated position of the computer navigation device as solid and dashed lines on a map.

For example, as illustrated in FIG. 2, the tracked position graphical element 60 may be a line of a first pattern, color and/or thickness, such as a solid line 61, depicting the movement of the vehicle 22 along a map 64 while the navigation module 56 receives a signal 20 from the GPS system 18. The calculated position graphical element 62 may be a line of a second pattern, color and/or thickness, such as a dashed or dotted line 63, depicting the movement of the vehicle 22 along the map 64. Other combinations of distinguishable lines may alternatively be used, such as two different dashed lines, two different colored lines, or lines of two different thicknesses, etc. Some embodiments may include a dropped signal graphical element 65 and/or a signal restored element 67. These elements may also aid the user's awareness of the signal condition.

Figure 3:
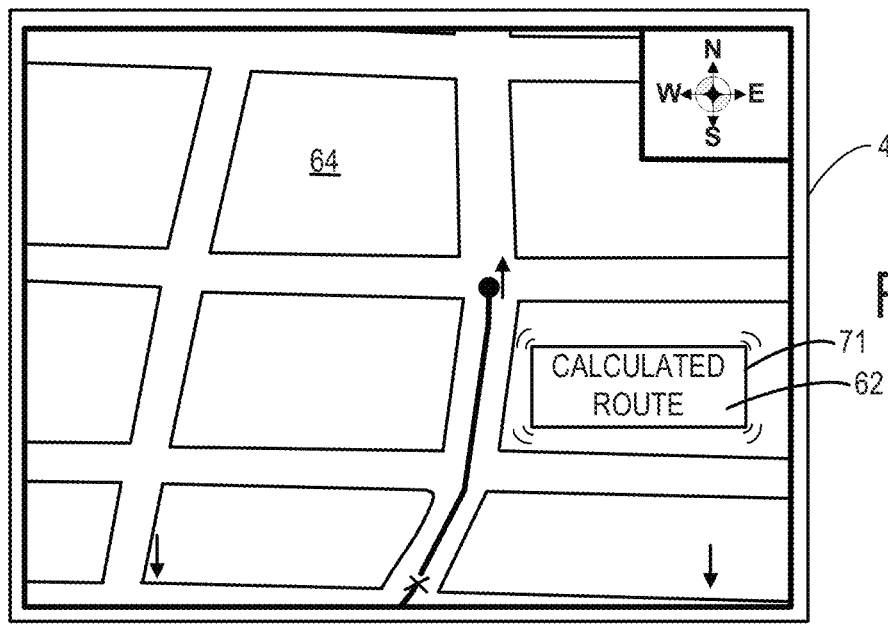
FIG. 3 illustrates a second screen of the graphical user interface of FIG. 2, showing a textual graphical element indicating that a computed route based on a calculated position of the computing navigation device is being displayed.

As shown in FIG. 3, the tracked position graphical element 60 may be a line superimposed on a depiction of the map 64, and the calculated position graphical element 62 may be a floating graphical element on the display during the dropped signal condition such as a text item 71 indicting to the user that the GPS signal has been dropped, and the route is being calculated rather than tracked. The text item 71 may flash or change color to increase visibility. It will be appreciated that other types of floating graphical elements may also be used, such as graphical icons, letters, numbers, etc.

Figure 4A:
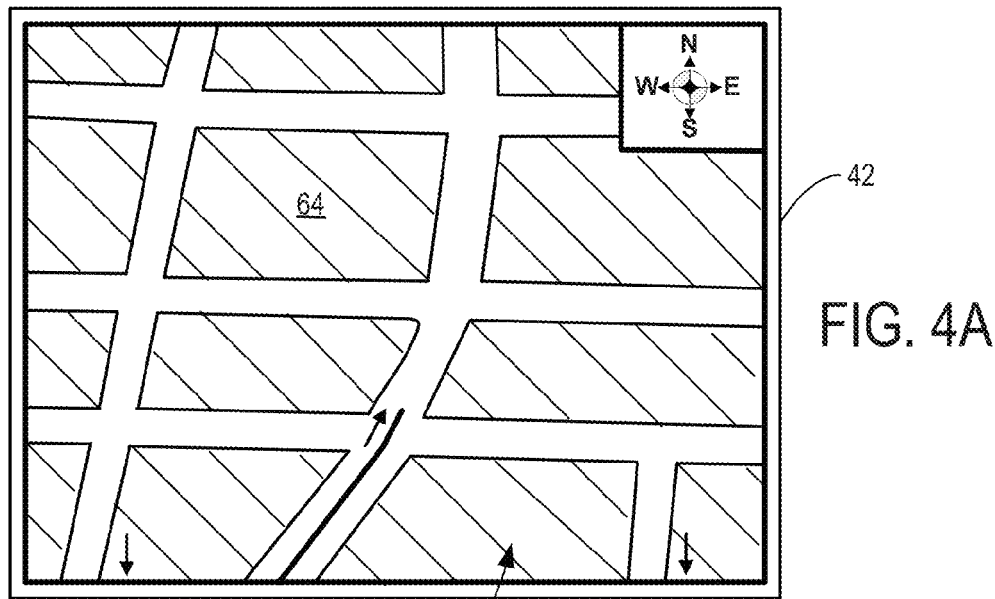
FIG. 4A illustrates a third screen of the graphical user interface of FIG. 2, showing a tracked position indicated by a solid line and a map presented in a first color scheme.
Figure 4B:
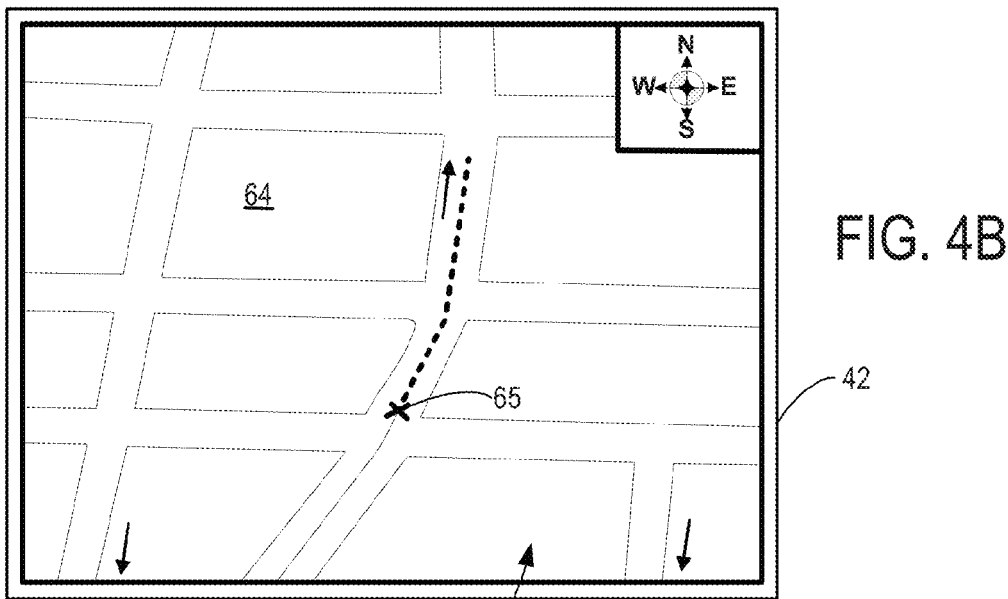
FIG. 4B illustrates a fourth screen of the graphical user interface of FIG. 2, showing a calculated position indicated by a dashed line and a map presented in a second color scheme.

Another example embodiment is illustrated in FIGS. 4A and 4B wherein the tracked position graphical element 60 may be a depiction of the map 64 and/or the entire display displayed in a first color scheme, as schematically depicted with bold lines and hatching in FIG. 4A. The calculated position graphical element 62 may be a depiction of the map 64 and/or the entire display being displayed in a second color scheme, as schematically depicted with relatively thinner lines in FIG. 4B. In other embodiments in which the color scheme of the map or display changes to indicate that the position of the vehicle is being calculated, a graphical depiction of the traveled path may be omitted from the display, such that the current position of the vehicle is shown by a graphical element, but prior calculated positions are not shown.

Some embodiments may include a graphical element depicting the location of the vehicle that may remain in substantially the same location on the display while the regions displayed on the superimposed map adjust as the vehicle moves, depicting movement of the vehicle across the map. Comparison of FIG. 2 to FIG. 3 illustrates such movement although other features of FIG. 2 have been included to illustrate other aspects of various embodiments.

Figure 5:
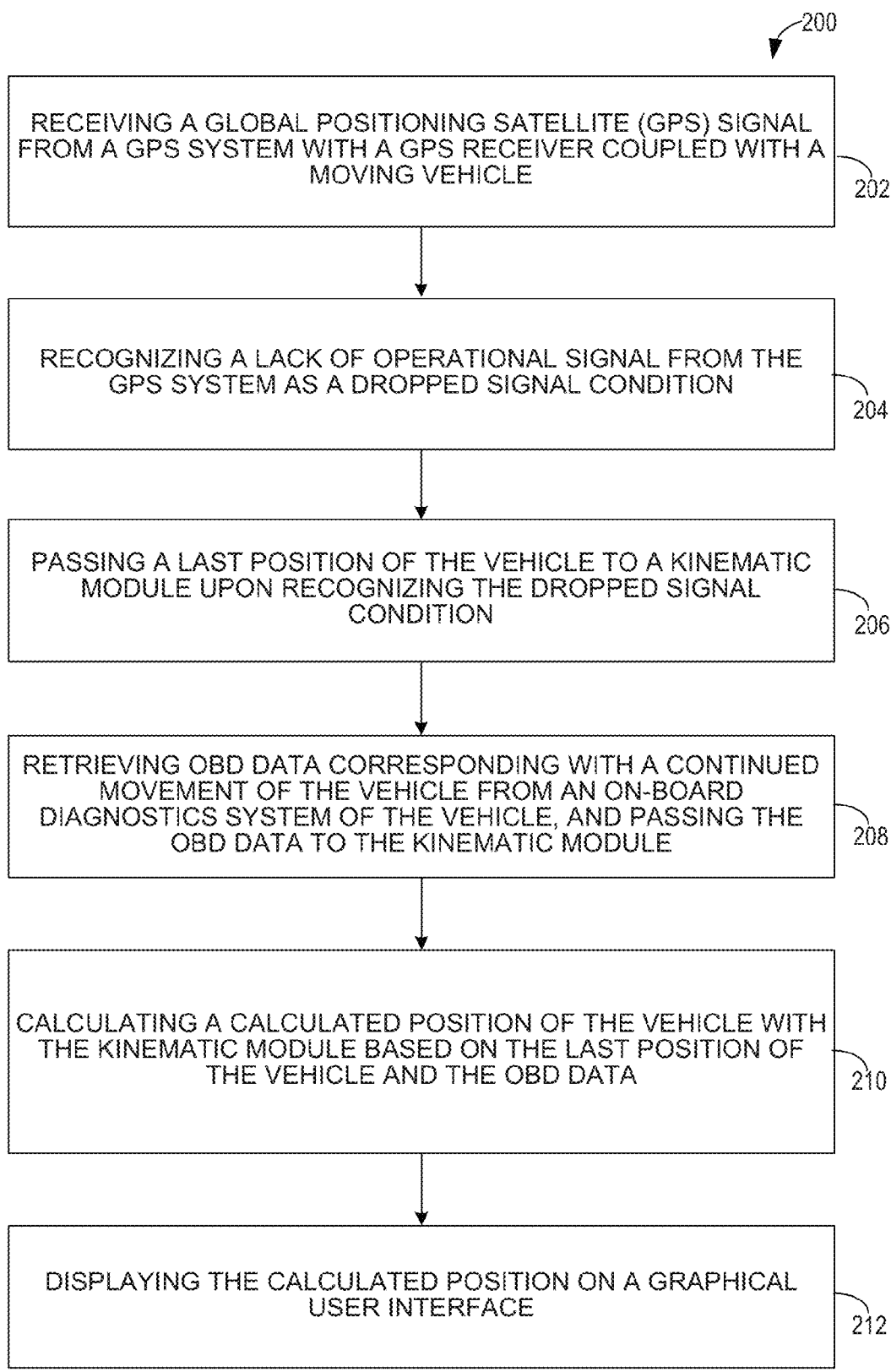
FIG. 5 is a flowchart illustrating one embodiment of a method for dead reckoning.

FIG. 5 is a flow chart illustrating an embodiment of a method for dead reckoning. The method may be implemented using the hardware and software components of navigation system 10 described above, or using other suitable hardware and software. The method 200 may include, at 202, receiving a GPS signal from a GPS system having a GPS receiver and being coupled with a moving vehicle. At 204, the method may include recognizing a lack of operational signal from the GPS system as a dropped signal condition. At 206, the method may include passing a last position of the vehicle to a kinematic module upon reaching the dropped signal condition. The passing of the last position may be effected upon recognizing a lack of signal from the GPS system by a signal monitoring module, and the method may further include communicating with an OBD data retrieval module to pass the OBD data to the kinematic module upon recognizing the lack of signal from the GPS system.

At 208, the method may include retrieving OBD data corresponding with a continued movement of the vehicle from an on-board diagnostics system of the vehicle, and passing the OBD data to the kinematic module. As discussed above, retrieving OBD data from the on-board diagnostics system may include retrieving one or more of the speed of the vehicle, the steering wheel angle, and the cardinal direction, among other parameters. In some embodiments, the data is retrieved based on user input instructions that are received from a graphical user interface to effect changes in the display or calculation of the position of the vehicle. At 210, the method may include calculating a calculated position of the vehicle with the kinematic module based on the last position of the vehicle and the OBD data. As discussed above, calculating the calculated position may include performing a calculation based on one or more of a speed of the vehicle, a steering wheel angle, and a cardinal direction, among other parameters. At 212, the method may include displaying the calculated position of the vehicle on a graphical user interface.

Some embodiments may provide a method that may further include displaying a tracked position of the vehicle on the graphical user interface based on the stream of signals from GPS system. Displaying the tracked position of the vehicle may include displaying the position of the vehicle via a tracked position graphical element during a signal receiving condition indicating that an operational signal is being received from the GPS system, and the displaying the calculated position of the vehicle may include displaying the position of the vehicle via a calculated position graphical element during the dropped signal condition. The tracked position graphical element and the calculated position graphical element may be distinguishable in appearance in the various manners described above.

The systems and methods described above may enable efficient calculation of a position of a vehicle upon loss of the ability to sufficiently track the position of the vehicle using global positioning satellites, reducing potential confusion to vehicle operators.

It will be appreciated that the computing navigation device described herein may be any suitable computing device configured to execute the programs described herein. For example, the computing navigation device may be a personal computer, laptop computer, portable data assistant (PDA), computer-enabled wireless telephone, networked computing device, or other suitable computing device, and may be connected to a computer network, such as the Internet. The computing device typically includes a processor and associated volatile and non-volatile memory, and is configured to execute programs stored in non-volatile memory using portions of volatile memory and the processor. As used herein, the terms "program" and "module" refers to software or firmware components that may be executed by, or utilized by, one or more computing devices described herein, and is meant to encompass individual or groups of executable files, data files, libraries, drivers, scripts, database records, etc. It will be appreciated that computer-readable media may be provided having program instructions stored thereon, which upon execution by a computing device, cause the computing device to execute the methods described above and cause operation of the systems described above.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A navigation device, comprising:
   a processor configured to:
      track a path of the navigation device based on a first signal received by the navigation device; and
      calculate a calculated position of the navigation device based on a second signal different from the first signal; and
   a graphical user interface configured to display a calculated position graphical element representing the calculated position determined based on the second signal and display a tracked position graphical element representing the path of the navigation device determined based on the first signal, the tracked position graphical element and the calculated position graphical element being distinguishable in appearance.

2. The navigation device of claim 1, wherein the processor is further configured to:
 receive as the first signal a global positioning satellite (GPS) system signal; and
 display the tracked position graphical element based on the first signal during a signal receiving condition indicating that the first signal is being received.

3. The navigation device of claim 2, wherein the processor is further configured to:
 recognize a dropped signal condition in which an operational first signal is not received and a position of the navigation device cannot be tracked;
 identify a last tracked position of the navigation device corresponding to a time of the dropped signal condition;
 calculate the calculated position of the navigation device from the last tracked position based on the second signal during the dropped signal condition; and
 display the calculated position graphical element at least during the dropped signal condition.

4. The navigation device of claim 1, wherein:
 the tracked position graphical element is a line of a first pattern depicting the movement of the navigation device along a map; and
 the calculated position graphical element is a line of a second pattern depicting the movement of the navigation device along the map.

5. The navigation device of claim 1, wherein:
 the tracked position graphical element is a line of a first color depicting the movement of the navigation device along a map; and
 the calculated position graphical element is a line of a second color depicting the movement of the navigation device along the map.

6. The navigation device of claim 1, wherein:
 the tracked position graphical element is a line of a first thickness depicting the movement of the navigation device along a map; and
 the calculated position graphical element is a line of a second thickness depicting the movement of the navigation device along the map.

7. The navigation device of claim 1, wherein the calculated position graphical element is selected from the group consisting of a text item, graphical icon, letter, number, and color scheme.

8. The navigation device of claim 1, wherein the navigation device is on board a vehicle, and wherein the first signal includes on-board diagnostic (OBD) data retrieved from an on-board diagnostic system of the vehicle.

9. The navigation device of claim 8, wherein the processor is further configured to:
 receive the first signal including the OBD data corresponding with a movement of the vehicle from the on-board diagnostics system; and
 calculate the calculated position from a last tracked position of the vehicle at the time the dropped signal condition was recognized, based on the OBD data.

10. The navigation device of claim 9, wherein the OBD data includes a speed, a steering wheel angle, and a cardinal direction of the navigation device.

11. The navigation device of claim 10, wherein the processor is configured to execute a kinematic module to calculate the calculated position of the navigation device, and wherein the kinematic module is configured to calculate the calculated position based on one or more of the speed of the navigation device, the steering wheel angle, and the cardinal direction in the OBD data.

12. A method for dead reckoning, comprising:
 tracking a path of a navigation device based on a first signal received by the navigation device; and
 calculating a calculated position of the navigation device based on a second signal different from the first signal; and
 displaying a graphical user interface including a calculated position graphical element representing the calculated position determined based on the second signal and displaying a tracked position graphical element representing the path of the navigation device determined based on the first signal, the tracked position graphical element and the calculated position graphical element being distinguishable in appearance.

13. The method of claim 12, further comprising:
 receiving as the first signal a global positioning satellite (GPS) system signal; and
 displaying the tracked position graphical element based on the first signal during a signal receiving condition indicating that the first signal is being received.

14. The method of claim 13, further comprising:
 recognizing a dropped signal condition in which an operational first signal is not received and a position of the navigation device cannot be tracked;
 identifying a last tracked position of the navigation device corresponding to a time of the dropped signal condition;
 calculating the calculated position of the navigation device from the last tracked position based on the second signal during the dropped signal condition; and
 displaying the calculated position graphical element at least during the dropped signal condition.

15. The method of claim 12, wherein:
 the tracked position graphical element is a line of a first pattern, color and/or thickness, depicting the movement of the navigation device along a map; and
 the calculated position graphical element is a line of a second pattern, color and/or thickness, depicting the movement of the navigation device along the map.

16. The method of claim 12, wherein the navigation device is on board a vehicle, and wherein the first signal includes on-board diagnostic (OBD) data retrieved from an on-board diagnostic system of the vehicle.

17. The method of claim 16, further comprising:
 receiving the first signal including the OBD data corresponding with a movement of the vehicle from the on-board diagnostics system; and
 calculating the calculated position from a last tracked position of the vehicle at the time the dropped signal condition was recognized, based on the OBD data.

18. The method of claim 16, wherein receiving the first signal including the OBD data from the on-board diagnostics system includes receiving one or more of a speed, a steering wheel angle, and a cardinal direction of the vehicle.

19. The method of claim 16, wherein calculating the calculated position from the last tracked position of the vehicle includes performing a calculation based on one or more of a speed, a steering wheel angle, and a cardinal direction of the vehicle.

20. A computer readable storage medium comprising stored instructions that when executed by a processor of a navigation device cause the navigation device to:
 track a path of the navigation device based on a first signal received by the navigation device; and calculate a calculated position of the navigation device based on a second signal different from the first signal; and display on a graphical user interface a calculated position graphical element representing the calculated position determined based on the second signal and display a tracked position graphical element representing the path of the navigation device determined based on the first signal, the tracked position graphical element and the calculated position graphical element being distinguishable in appearance.

21. The computer readable storage medium of claim 20, further comprising stored instructions that when executed by the processor of the navigation device cause the navigation device to:

receive as the first signal a global positioning satellite (GPS) system signal; and display the tracked position graphical element based on the first signal during a signal receiving condition indicating that the first signal is being received.

22. The computer readable storage medium of claim 21, further comprising stored instructions that when executed by the processor of the navigation device cause the navigation device to:

recognize a dropped signal condition in which an operational first signal is not received and a position of the navigation device cannot be tracked;

identify a last tracked position of the navigation device corresponding to a time of the dropped signal condition;

calculate the calculated position of the navigation device from the last tracked position based on the second signal during the dropped signal condition; and display the calculated position graphical element at least during the dropped signal condition.

23. The computer readable storage medium of claim 20, further comprising stored instructions that when executed by the processor of the navigation device cause the navigation device to:

display the tracked position graphical element as a line of a first pattern, color and/or thickness, depicting the movement of the navigation device along a map; and display the calculated position graphical element as a line of a second pattern, color and/or thickness, depicting the movement of the navigation device along the map.

24. The computer readable storage medium of claim 20, wherein the navigation device is on board a vehicle, and wherein the first signal includes on-board diagnostic (OBD) data retrieved from an on-board diagnostic system of the vehicle.

\* \* \* \* \*